S. I. FEKETE.
STOVE FOR INTAKE MANIFOLDS OF INTERNAL COMBUSTION ENGINES.
APPLICATION FILED NOV. 5, 1920.

1,396,363.

Patented Nov. 8, 1921.

INVENTOR:
Stephen Ivan Fekete
by Macleod Calver Copeland Dike
ATTYS.

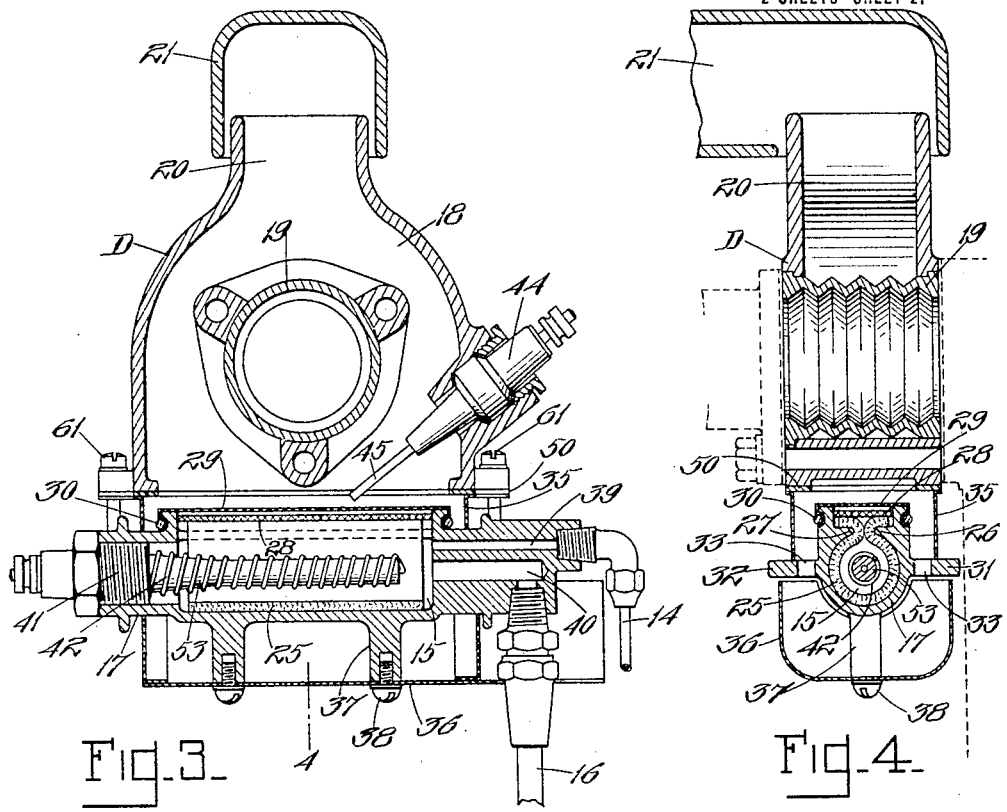
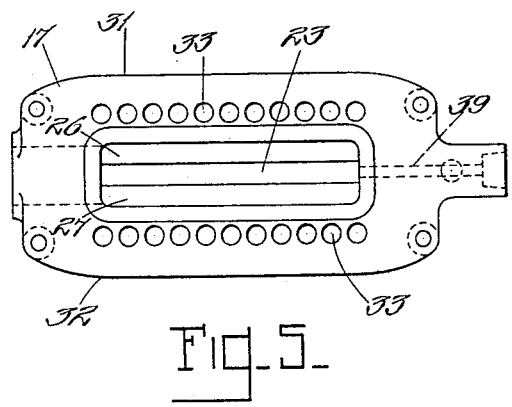
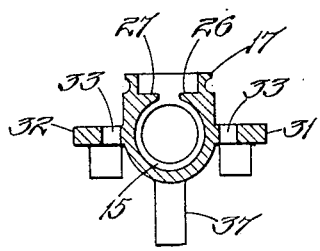

UNITED STATES PATENT OFFICE.

STEPHEN IVAN FEKETE, OF DETROIT, MICHIGAN, ASSIGNOR TO ESSEX MOTORS, OF DETROIT, MICHIGAN, A CORPORATION OF MICHIGAN.

STOVE FOR INTAKE-MANIFOLDS OF INTERNAL-COMBUSTION ENGINES.

1,396,363.  Specification of Letters Patent.  Patented Nov. 8, 1921.

Application filed November 5, 1920. Serial No. 421,891.

*To all whom it may concern:*

Be it known that I, STEPHEN I. FEKETE, a citizen of Hungary, residing at Detroit, county of Wayne, State of Michigan, have invented a certain new and useful Improvement in Stoves for Intake-Manifolds of Internal-Combustion Engines, of which the following is a specification, reference being had therein to the accompanying drawings.

My present invention has for its object a device for supplying heat to the contents of the inlet manifold of an internal combustion engine and is adapted particularly for use in starting the engine. The present invention is an improvement on the stove for intake manifolds of internal combustion engines shown and described in my prior application for a United States patent, filed October 5, 1920, Serial No. 414,921. In that application there is shown and described a stove supplied with fuel from the accumulation of unvaporized fuel which occurs in the intake manifold of an internal combustion engine. The stove embodying my present invention is supplied with fuel from an independent source of fuel supply, such for instance, as an auxiliary tank carried in some convenient location on the motor vehicle or other machine with which the device is used. The fuel particularly intended to be used with the stove shown herein is alcohol or some other fuel which can be burned with a relatively small air supply and which will give an intense heat without smoking or producing fumes having an objectionable odor.

The invention will be fully understood from the following description when taken in connection with the accompanying drawings, and the novel features thereof will be pointed out and clearly defined in the claims at the close of this specification.

In the drawings, Figure 1 is a side elevation of the front part of an automobile to which is applied a stove embodying my present invention.

Fig. 3 is a section on line 3—3 of Fig. 2.

Fig. 4 is a section on line 4 of Fig. 3.

Fig. 5 is a plan view of the base 17.

Fig. 6 is a cross section of the base 17.

Figure 1:
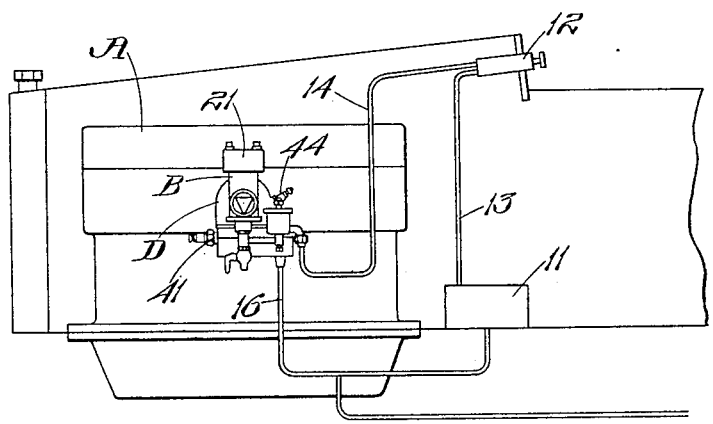

Referring now to the drawings, at A is shown the engine, at B a carbureter, this carbureter being of the type shown in the patent to Emil Huber, dated June 29, 1920, No. 1,344,696, at C the intake manifold of the engine, and at D the body of the stove embodying my invention. At 11 is shown an auxiliary fuel tank. At 12 is shown a priming pump connected by the pipe 13 with the tank 11 and by the pipe 14 with the fuel pit 15 of the stove. At 16 is shown a return pipe by which surplus fuel is returned to the tank 11. As will be explained later, only a predetermined amount of fuel can be injected into the fuel pit 15 and any surplus will run back to the tank 11. This is an important feature of my invention, as it is found in practice that the user of the vehicle will operate the pump more than is necessary, or will operate the pump while the stove is burning and therefore very hot. Accordingly, provision has been made so that the excess fuel will be returned to the tank, and not be wasted nor vaporized and burned suddenly which might result in the vehicle catching fire or in a small explosion. These dangers are completely overcome by the arrangement shown since it is impossible to supply the stove with more than the predetermined quantity of fuel.

Figure 2:
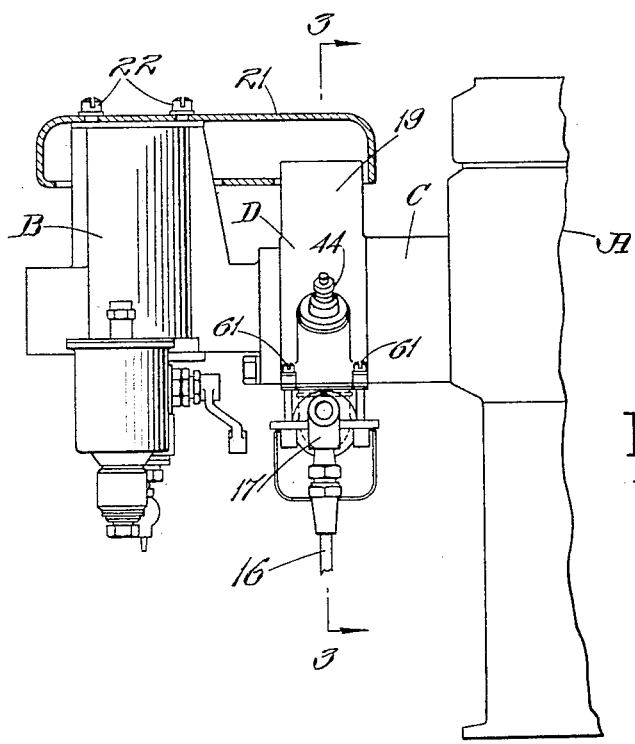
Fig. 2 is an elevation of the carbureter and stove intake manifold portion of the engine shown in Fig. 1.

The stove includes a body or casing D and a burner casting 17 conveniently called a burner. The body forms a chamber 18 surrounding an elongation 19 of the inlet manifold. A chimney 20 for the escape of the heated products of combustion is also provided, and this chimney opens into a hood 21 secured by screws 22, 22 (see Fig. 2) to the top of the carbureter B. The hood 21 is in metallic contact with the top of the carbureter and, therefore, the heat absorbed by the hood from the products of combustion emerging from the chimney 20 is rapidly transferred to the body of the carbureter. The body of the carbureter is also in contact with the body of the stove and, therefore, the entire carbureter is heated soon after the operation of the stove begins.

The burner 17 contains the fuel pit 15 and has in its upper surface an oblong wick opening 23 (see Fig. 5) formed by two inwardly projecting horizontal shoulders 26 and 27. The fuel pit 15 contains a broad lamp wick 25 and arranged in the fuel pit in the cylindrical form shown in Fig. 4 and having a hollow central portion. The upper ends of this wick extend up through the horizontal opening 23 and overlie the shoulders 26 and 27, as shown, and are covered by a sheet 28 of wire-woven asbestos and a cap 29 of gauze or other metallic reticulated material which is secured to the burner by a wire 30. On each side of the burner is a flange 31, 32 perforated by air holes 33, and surrounding the upper part of the burner is a housing 35 made of thin sheet metal. The edge of the housing 35 is kept from metallic contact with the body of the stove by a non-conducting gasket 50. The holes 33 form flues for the passage of air upward to the burner. The burner 17 is held in place under the stove by bolts 61 which hold the burner against the housing 35 and the housing against the body D. This construction is such that the air which passes up through the holes 33 to feed the burner also tends to cool the housing 35. Since the burner is suspended below the body D and at a distance from it, and since the housing is separated from the body by the non-conducting gasket 50, the burner is not heated to any objectionable extent. This is very important, because overheating of the walls of the fuel pit might vaporize the fuel too rapidly or even to a dangerous extent.

The bottom of the burner is surrounded by a wire gauze cup 36 secured to projections 37 on the base by screws 38. This cup serves to retain within the burner any flame which may emerge through the air holes 33 and prevents any danger of fire from the heavy gusts of wind or from the draft from the fan of the engine.

As previously stated, fuel is supplied to the fuel pit 15 containing the wick 25 by the pipe 14 which communicates with the fuel pit through the passage 39. At 40 is shown the overflow passage communicating with the return pipe 16 to the tank. It will, therefore, be seen that when the pump 12 is operated, the fuel pit will be filled up to the bottom of the overflow passage 40 and the surplus fuel will escape through the pipe 16.

At 41 is shown an electric vaporizing unit having a heating coil 42 arranged about the cylindrical end of the porcelain 53. The heating unit extends into the hollow portion of the cylindrical wick 25 and, therefore, when the heating coil 42 is energized, the fuel in contact with it, is rapidly vaporized and and the vapor passes up through the interstices between the wicks 25 into the chamber 18. At 44 is shown an ingnition plug having an electrode 45 at which a spark is produced. The point of this electrode is in close proximity to the metallic screen 29 which incloses the top of the burner and, as the screen is grounded to the body and through the body to the engine, a spark will be formed between the electrode 45 and the screen 29 whenever the current is passing through the ignition plug.

The result of this construction is that the vapor which escapes from the fuel pit is instantly ignited, lighting the burner so that thereafter the burner continues to burn until all the fuel in the pit is exhausted. The flames from the burner play directly on the extension of the intake manifold 19 and heat it intensely hot. This extension of the intake manifold is corrugated, as shown in the drawings, and is conveniently formed from a piece of corrugated copper tubing which is pressed into the body of the intake manifold. The corrugations serve to increase the heating surface exposed to the flame of the burner and the radiating surface across which the explosive mixture must pass on its way to the engine.

In operating the device embodying my invention, the pump 12 is given one or two strokes which fill the fuel pit and saturate the wick, the surplus fuel running back to the tank. Then the electric current is turned on. This heats the vaporizing unit 41 and vaporizes some of the fuel in the fuel pit. The inflammable vapor rises through the gauze cover 29 and when it enters the chamber 18, is ignited by the spark plug 44 which lights the burner. The flames play directly on the corrugated extension 19 of the intake manifold. The vapor from the fuel continues to burn until the fuel is exhausted whereupon the device automatically ceases to operate. The length of time which the stove will operate is determined by the capacity of the fuel pit. Ordinarily, this will be from five to ten minutes, so that the fuel consumed by the device is almost negligible.

What I claim is,—

1. In combination with the intake manifold of an internal combustion engine, a burner for heating said manifold, said burner having a fuel pit, a reservoir, a pump for supplying fuel from said reservoir to said fuel pit, and pipe connections including an overflow pipe from the fuel pit to the reservoir.

2. In combination with the intake manifold of an internal combustion engine, a fuel pit, a wick burner for heating said manifold, said burner receiving its fuel from said fuel pit, a reservoir, a pump for supplying fuel from said reservoir to said fuel pit, pipe connections including an overflow pipe from the fuel pit to the reservoir, and electric vaporizing means in the fuel pit.

3. In combination with the intake manifold of an internal combustion engine, a fuel pit, a wick burner for heating said manifold, said burner receiving its fuel from said fuel pit, a reservoir, a pump for supplying fuel from said reservoir to said fuel pit, pipe connections including an overflow pipe from the fuel pit to the reservoir, electric vaporizing means in the fuel pit, and electric igniting means adjacent the wick burner.

4. In combination with the intake manifold of an internal combustion engine, and a carbureter therefor, a unit insertible between the carbureter and the end of the manifold, which unit contains a passage therein which is an extension of the intake manifold and is formed by a corrugated tube, a chamber surrounding the said corrugated tube, and a burner adapted to heat the walls of the tube.

5. In combination with the intake manifold of an internal combustion engine, and a carbureter therefor, a unit insertible between the carbureter and the end of the manifold, which unit contains a passage therein which is an extension of the intake manifold and is formed by a circumferentially corrugated tube, a chamber surrounding the said corrugated tube, and a burner adapted to heat the walls of the tube.

6. In combination with the intake manifold of an internal combustion engine, a chamber surrounding a portion of the manifold, a fuel pit below the chamber, a wick burner separating the fuel pit from the chamber, electric vaporizing means in the fuel pit, and an electric igniting device in the chamber adjacent the burner.

7. In combination with the intake manifold of an internal combustion engine, a fuel pit below the manifold, a burner supplied with fuel therefrom to heat the manifold, a wick, an electric vaporizing unit in the fuel pit, and an igniting device in the chamber adjacent the burner.

8. In combination with the intake manifold of an internal combustion engine, a chamber surrounding a portion of the manifold, a burner below the chamber and containing a fuel pit, a wick in the burner, a non-combustible reticulated member between the burner and the chamber, an electric vaporizing unit in the fuel pit below the reticulated member, and an ignition device in the chamber above said member.

9. In combination, the intake manifold of an internal combustion engine, a fuel pit below the manifold, a wick arranged in tubular form in said fuel pit, an electric vaporizing unit in the fuel pit, said vaporizing unit extending lengthwise into the hollow interior of the tubular wick and an ignition device in the chamber adjacent the burner.

10. In combination with the intake manifold of an internal combustion engine, a chamber in which the combustion takes place surrounding a portion of the manifold, a burner body below the chamber spaced apart therefrom and containing a fuel pit, and a thin sheet metal member inclosing the space between the burner and the chamber, said member having a cross-sectional area which is small in proportion to its exterior radiating surface so that heat from combustion in the chamber shall not be conducted to the burner in sufficient quantities to cause vaporization of the fuel in the fuel pit therein.

11. In combination with an intake manifold of an internal combustion engine, a chamber in which the combustion takes place surrounding a portion of the manifold, a burner body below the chamber spaced apart therefrom and containing a fuel pit, and a thin sheet metal member inclosing the space between the burner and the chamber, said member having a small cross-sectional area in proportion to its exterior radiating surface and there being air holes through the burner body inside and adjacent the sheet metal member so that the air stream to the chamber shall cool the sheet metal member, these parts being constructed so that heat from combustion in the chamber shall not be conducted to the burner in sufficient quantities to cause vaporization of the fuel in the fuel pit therein.

In testimony whereof I affix my signature.

STEPHEN IVAN FEKETE.